(12) United States Patent
Darling et al.

(10) Patent No.: US 11,896,935 B2
(45) Date of Patent: Feb. 13, 2024

(54) FILTRATION MEMBRANES

(71) Applicants: UCHICAGO ARGONNE, LLC, Chicago, IL (US); THE UNIVERSITY OF CHICAGO, Chicago, IL (US)

(72) Inventors: Seth B. Darling, Chicago, IL (US); Jeffrey W. Elam, Elmhurst, IL (US); Ruben Waldman, Chicago, IL (US)

(73) Assignees: UCHICAGO ARGONNE, LLC, Chicago, IL (US); UNIVERSITY OF CHICAGO, Chicago, IL (US)

( * ) Notice: Subject to any disclaimer, the term of this patent is extended or adjusted under 35 U.S.C. 154(b) by 0 days.

(21) Appl. No.: 15/680,064

(22) Filed: Aug. 17, 2017

(65) Prior Publication Data

US 2019/0054426 A1 Feb. 21, 2019

(51) Int. Cl.

| | |
|---|---|
| *B01D 69/02* | (2006.01) |
| *B01D 69/12* | (2006.01) |
| *B01D 71/36* | (2006.01) |
| *B01D 71/42* | (2006.01) |
| *B01D 67/00* | (2006.01) |
| *B01D 71/34* | (2006.01) |
| *B01D 69/14* | (2006.01) |
| *B01D 71/82* | (2006.01) |
| *B01D 71/68* | (2006.01) |
| *B01D 69/10* | (2006.01) |

(52) U.S. Cl.
CPC ......... *B01D 69/02* (2013.01); *B01D 67/0002* (2013.01); *B01D 69/125* (2013.01); *B01D 71/36* (2013.01); *B01D 71/42* (2013.01); *B01D 67/0072* (2013.01); *B01D 67/0079* (2013.01); *B01D 69/105* (2013.01); *B01D 69/141* (2013.01); *B01D 69/148* (2013.01); *B01D 71/34* (2013.01); *B01D 71/68* (2013.01); *B01D 71/82* (2013.01)

(58) Field of Classification Search
None
See application file for complete search history.

(56) References Cited

U.S. PATENT DOCUMENTS

| | | |
|---|---|---|
| 3,617,552 A | 11/1971 | Will et al. |
| 4,744,889 A | 5/1988 | Kruyer |

(Continued)

FOREIGN PATENT DOCUMENTS

| | | |
|---|---|---|
| WO | WO-2006/033924 | 3/2006 |
| WO | WO-2011/138583 A1 | 11/2011 |
| WO | WO-2015/076438 A1 | 5/2015 |

OTHER PUBLICATIONS

Lee et al., "An Alternative Route Towards Metal-Polymer Hybrid Materials Prepared by Vapor-Phase Processing", Adv. Funct. Mater., 21, pp. 3047-3055, 2011, 9 total p. (Year: 2011).*

(Continued)

*Primary Examiner* — Jonathan M Peo
(74) *Attorney, Agent, or Firm* — Foley & Lardner, LLP

(57) ABSTRACT

Polymeric membranes are modified via SIS to promote membrane resilience, prolong membrane lifetime, and mitigate fouling. Modified membranes include an inorganic material within an outer portion of the modified membrane and a polymeric core that remains unmodified by the inorganic material. The polymer may be removed leaving an inorganic material patterned from an initial unmodified polymeric membrane.

10 Claims, 7 Drawing Sheets

(56) References Cited

U.S. PATENT DOCUMENTS

| | | | |
|---|---|---|---|
| 4,889,542 A | 12/1989 | Hayes | |
| 5,133,881 A | 7/1992 | Miller et al. | |
| 5,645,733 A | 7/1997 | Hobson | |
| 5,973,068 A | 10/1999 | Yamaya et al. | |
| 6,326,326 B1 | 12/2001 | Feng et al. | |
| 6,723,595 B2 | 4/2004 | Park | |
| 8,980,418 B2 | 3/2015 | Darling et al. | |
| 9,103,086 B2 | 8/2015 | Cantrell et al. | |
| 9,719,226 B2 | 8/2017 | Riedel | |
| 2002/0005360 A1 | 1/2002 | Haug et al. | |
| 2002/0043216 A1 | 4/2002 | Hwang et al. | |
| 2002/0144595 A1 | 10/2002 | Wang et al. | |
| 2003/0082412 A1 | 5/2003 | Fukuda et al. | |
| 2005/0081907 A1 | 4/2005 | Lewis et al. | |
| 2006/0048938 A1 | 3/2006 | Kalman | |
| 2006/0088666 A1 | 4/2006 | Kobrin et al. | |
| 2008/0073288 A1 | 3/2008 | Fan et al. | |
| 2008/0107809 A1* | 5/2008 | Wu | C23C 16/34 427/248.1 |
| 2008/0286448 A1 | 11/2008 | Elam et al. | |
| 2009/0111703 A1 | 4/2009 | Gopalan | |
| 2009/0297868 A1 | 12/2009 | Ito et al. | |
| 2009/0304920 A1 | 12/2009 | Elam et al. | |
| 2010/0003406 A1* | 1/2010 | Lam | C23C 16/4412 427/255.391 |
| 2010/0080903 A1 | 4/2010 | Tamitsuji et al. | |
| 2011/0042301 A1 | 2/2011 | Zhang et al. | |
| 2011/0056886 A1 | 3/2011 | De Luca | |
| 2011/0168454 A1 | 7/2011 | Keshavan et al. | |
| 2012/0046421 A1 | 2/2012 | Darling et al. | |
| 2012/0171403 A1 | 7/2012 | Dodge | |
| 2013/0059123 A1 | 3/2013 | Wang et al. | |
| 2013/0095996 A1 | 4/2013 | Buelow et al. | |
| 2014/0370259 A1 | 12/2014 | Edwards et al. | |
| 2014/0371060 A1 | 12/2014 | Smith et al. | |
| 2017/0025658 A1* | 1/2017 | Shi | C23C 14/24 |
| 2017/0157534 A1 | 6/2017 | Curtis et al. | |
| 2017/0166456 A1 | 6/2017 | Darling et al. | |
| 2017/0304778 A1* | 10/2017 | Ye | B01D 71/022 |
| 2018/0303941 A1* | 10/2018 | Ameer | A61K 48/0016 |
| 2018/0342176 A1* | 11/2018 | Californiaa | G09B 21/004 |
| 2020/0062600 A1* | 2/2020 | Kidambi | C01B 32/186 |

OTHER PUBLICATIONS

Li, F., et al., "Precise pore size tuning and surface modifications of polymeric membranes using the atomic layer deposition technique," J. Membr. Sci. 2011, 385-386, 1-9.

Wang, Q., et al., "PVDF membranes with simultaneously enhanced permeability and selectivity by breaking the tradeoff effect via atomic layer deposition of TiO2," J. Membr. Sci. 2013, 442, 57-64.

Xu, Q., et al., "Atomic layer deposition of alumina on porous polytetrafluoroethylene membranes for enhanced hydrophilicity and separation performances," J. Membr. Sci. 2012, 415-416, 435-443.

Xu, Q., et al., "Hydrophilization of porous polypropylene membranes by atomic layer deposition of TiO2 for simultaneously improved permeability and selectivity," J. Membr. Sci. 2013, 448, 215-222.

Barry, et al., "Advanced oil sorbents using sequential infiltration synthesis," Journal of Materials Chemistry A 5(6), pp. 2929-2935 (2017).

Bico, et al., "Wetting of textured surfaces," Colloids and Surfaces A: Physicochemical and Engineering Aspects 206(1-3), pp. 41-46 (2002).

Bobji, et al., "Underwater sustainability of the 'Cassie' state of wetting," Langmuir 25(20), p. 12120- 12126 (2009).

Buluswar, et al., "50 Breakthroughs: Critical scientific and technological advances needed for sustainable global development," Institute for Transformative Technologies, Lawrence Berkeley National Lab., 22 pages (2014).

Calcagnile, et al., "Magnetically Driven Floating Foams for the Removal of Oil Contaminants from Water," ACS Nano 6(6), pp. 5413-5419 (2012).

Cao, et al., "Hydrophobic/Hydrophilic Cooperative Janus System for Enhancement of Fog Collection," Small 11(34), pp. 4379-4384 (2015).

Chen & Xu, "Mineral-Coated Polymer Membranes with Superhydrophilicity and Underwater Superoleophobicity for Effective Oil/Water Separation," Scientific Reports 3, 2776, 6 pages (2013).

Chen, et al., "Bio-inspired CaCO3 coating for superhydrophilic hybrid membranes with high water permeability," Journal of Materials Chemistry 22, pp. 22727-22733 (2012).

Chen, et al., "Enhancing the hydrophilicity and water permeability of polypropylene membranes by nitric acid activation and metal oxide deposition," Journal of Membrane Science 487, pp. 109-116 (2015).

Cheryan & Rajagopalan, "Membrane processing of oily streams. Wastewater treatment and waste reduction," Journal of Membrane Science 151(1), pp. 13-28 (1998).

Choi, et al., "Effects of substrate conductivity on cell morphogenesis and proliferation using tailored, atomic layer deposition-grown ZnO thin films," Scientific Reports 5, 9974, 9 pages (2015).

Dillon, et al., "Surface chemistry of Al2O3 deposition using Al(CH3)3 and H2O in a binary reaction sequence," Surface Science 322 (1-3), pp. 230-242 (1995).

Dorrer & Ruhe, "Superaerophobicity: Repellence of air bubbles from submerged, surface-engineered silicon substrates," Langmuir 28(42), pp. 14968-14973 (2012).

Dudchenko, et al., "Coupling Underwater Superoleophobic Membranes with Magnetic Pickering Emulsions for Fouling-Free Separation of Crude Oil/Water Mixtures: An Experimental and Theoretical Study," ACS Nano 9(10), pp. 9930-9941 (2015).

Elam, et al., "Conformal coating on ultrahigh-aspect-ratio nanopores of anodic alumina by atomic layer deposition," Chemistry of Materials 15(18), pp. 3507-3517 (2003).

Elam, et al., "Spatially controlled atomic layer deposition in porous materials," Applied Physics Letters 91, pp. 177-184 (2007).

Fabreguette, et al., "Quartz crystal microbalance study of tungsten atomic layer deposition using WF6 and Si2H6," Thin Solid Films 488(1-2), pp. 103-110 (2005).

Fakhru'l-Razi, et al., "Review of technologies for oil and gas produced water treatment," Journal of Hazardous Materials 170(2-3), pp. 530-551 (2009).

Frackowiak & Beguin, "Carbon materials for the electrochemical storage of energy in capacitors," Carbon 39(6), pp. 937-950 (2011).

Gao, et al., "A Robust Polyionized Hydrogel with an Unprecedented Underwater Anti-Crude-Oil-Adhesion Property," Advanced Materials 28(26), pp. 5307-5314 (2016).

Ge, et al., "Pumping through Porous Hydrophobic/Oleophilic Materials: An Alternative Technology for Oil Spill Remediation," Angewandte Chemie 53(14), pp. 3612-3616 (2014).

George, "Atomic layer deposition: an overview," Chemical Reviews 110(1), pp. 111-131 (2010).

Guo, et al., "Robust Underwater Oil-Repellent Material Inspired by Columnar Nacre," Advanced Materials 28(38), pp. 8505-8510 (2016).

Hall, et al., "Energy storage in electrochemical capacitors: designing functional materials to improve performance," Energy & Environmental Science 3, pp. 1238-1251 (2010).

Hao, et al., "Oxygen Vacancies Lead to Loss of Domain Order, Particle Fracture, and Rapid Capacity Fade in Lithium Manganospinel (LiMn2O4) Batteries," ACS Applied Materials & Interfaces 6(14), pp. 10849-10857 (2014).

Hou, et al., "Biocatalytic Janus membranes for CO2 removal utilizing carbonic anhydrase," Journal of Materials Chemistry A 3, pp. 17032-17041 (2015).

Hu, et al,. "An ultrathin bilayer membrane with asymmetric wettability for pressure responsive oil/water emulsion separation," Journal of Materials Chemistry A, 3, pp. 23477-23482 (2015).

Huang & Wang, "A Simple Nanocellulose Coating for Self-Cleaning upon Water Action: Molecular Design of Stable Surface Hydrophilicity," Angewandte Chemie International Edition 56(31), pp. 9053-9057 (2017).

International Search Report and Written Opinion for PCT/US2017/041223 dated Sep. 28, 2017, 8 pages.

(56) References Cited

OTHER PUBLICATIONS

Janotti & Van De Walle, "Fundamentals of zinc oxide as a semiconductor," Reports on Progress in Physics 72(12), 29 pages (2009).
Jung, et al., "Improved functionality of lithium-ion batteries enabled by atomic layer deposition on the porous microstructure of polymer separators and coating electrodes," Advanced Energy Materials 2(8), pp. 1022-1027 (2012).
Jur, et al., "Temperature-dependent subsurface growth during atomic layer deposition on polypropylene and cellulose fibers," Langmuir 26(11), pp. 8239-8244 (2010).
Keshavarz, et al., "Enhancing oil removal from water by immobilizing multi-wall carbon nanotubes on the surface of polyurethane foam," Journal of Environmental Management 157, pp. 279-286 (2015).
Kim, et al., "A development of high power activated carbon using the KOH activation of soft carbon series cokes," Transactions on Electrical and Electronic Materials 15(2), pp. 81-86 (2014).
Kota, et al., "Hygro-responsive membranes for effective oil-water separation," Nature Communications 3, 1025, 8 pages (2012).
Kota, et al., "The design and applications of superomniphobic surfaces," NPG Asia Materials 6, e109, 16 pages (2014).
Lam, et al., "A Chemically Patterned Microfluidic Paper-based Analytical Device (C-uPAD) for Point-of-Care Diagnostics," Scientific Reports 7, 1188, 10 pages (2017).
Lee, et al., "Conformal Nitrogen-Doped $TiO_2$ Photocatalytic Coatings for Sunlight-Activated Membranes," Advanced Sustainable Systems 1(1-2), 1600041, 23 pages (2017).
Lee, et al., "Membrane materials for water purification: design, development, and application," Environmental Science: Water Research & Technology 2, pp. 17-42 (2016).
Lee, et al., "Nanofluidic transport governed by the liquid/vapour interface," Nature Nanotechnology 9, pp. 317-323 (2014).
Li, et al., "Modification of ceramic membranes for pore structure tailoring: The atomic layer deposition route," Journal of Membrane Science 397-398, pp. 17-23 (2012).
Li, et al., "Under-Water Superaerophobic Pine-Shaped Pt Nanoarray Electrode for Ultrahigh-Performance Hydrogen Evolution," Advanced Functional Materials 25(11), pp. 1737-1744 (2015).
Liu, et al., "Clam's Shell Inspired High-Energy Inorganic Coatings with Underwater Low Adhesive Superoleophobicity," Advanced Materials 24(25), pp. 3401-3405 (2012).
Macdiarmid, et al., "Polyaniline: a new concept in conducting polymers," Synthetic Metals 18(1-3), pp. 285-290 (1987).
McNeill, et al., "Electronic Conduction in Polymers. I. The Chemical Structure of Polypyrrole," Australian Journal of Chemistry 16(6), pp. 1056-1075 (1963).
Oh, et al., "Janus-Faced, Dual-Conductive/Chemically Active Battery Separator Membranes," Advanced Functional Materials 26(39), pp. 7074-7083 (2016).
Ozkaya, et al., "Combined in situ XPS and UHV-chemical force microscopy (CFM) studies of the plasma induced surface oxidation of polypropylene," Plasma Processes and Polymers 11(3), pp. 256-262 (2014).
Parsons, et al., "Mechanisms and reactions during atomic layer deposition on polymers," Coordination Chemistry Reviews 257 (23-24), pp. 3323-3331 (2013).
Pasta, et al., "A Desalination Battery," Nano Letters 12(2), pp. 839-843 (2012).
Peng, et al., "Janus separator of polypropylene-supported cellular graphene framework for sulfur cathodes with high utilization in lithium-sulfur batteries," Advanced Science 3(1), pp. 1-11 (2015).
Peng, et al., "Theoretical specific capacitance based on charge storage mechanisms of conducting polymers: Comment on 'Vertically oriented arrays of polyaniline nanorods and their super electrochemical properties'," Chemical Communications 47, pp. 4105-4107 (2011).
Pi, et al., "Polypropylene microfiltration membranes modified with $TiO_2$ nanoparticles for surface wettability and antifouling property," Journal of Membrane Science 500, pp. 8-15 (2016).
Porada, et al., "Review on the science and technology of water desalination by capacitive deionization," Progress in Materials Science 58(8), pp. 1388-1442 (2013).
Ren, et al., "A single-layer Janus membrane with dual gradient conical micropore arrays for self-driving fog collection," Journal of Materials Chemistry A 5, pp. 18403-18408 (2017).
Sasaki, et al., "Asymmetric Superhydrophobic/Superhydrophilic Cotton Fabrics Designed by Spraying Polymer and Nanoparticles," ACS Applied Materials & Interfaces 8(1), pp. 651-659 (2016).
Simon & Gogotsi, "Materials for electrochemical capacitors," Nature Materials 7, pp. 845-854 (2008).
Song, et al., "Anomalous Pseudocapacitive Behavior of a Nanostructured, Mixed-Valent Manganese Oxide Film for Electrical Energy Storage," Nano Letters 12(7), pp. 3483-3490 (2012).
Steele, et al., "Inherently Superoleophobic Nanocomposite Coatings by Spray Atomization," Nano Letters 9(1), pp. 501-505 (2009).
Sugimoto, et al., "Charge storage mechanism of nanostructured anhydrous and hydrous ruthenium-based oxides," Electrochimica Acta 52(4), pp. 1742-1748 (2006).
Sugimoto, et al., "Preparation of Ruthenic Acid Nanosheets and Utilization of Its Interlayer Surface for Electrochemical Energy Storage," Angewandte Chemie International Edition 42(34), pp. 4092-4096 (2003).
Suss, et al., "Water desalination via capacitive deionization: what is it and what can we expect from it?," Energy & Environmental Science 8, pp. 2296-2319 (2015).
Tao, et al., "An Intelligent Superwetting PVDF Membrane Showing Switchable Transport Performance for Oil/Water Separation," Advanced Materials 26(18), pp. 2943-2948 (2014).
Tian, et al., "Droplet and Fluid Gating by Biomimetic Janus Membranes," Advanced Functional Materials 24(38), pp. 6023-6028 (2014).
Toupin, et al., "Charge Storage Mechanism of $MnO_2$ Electrode Used in Aqueous Electrochemical Capacitor," Chemistry of Materials 16(16), pp. 3184-3190 (2004).
Ueda, et al., "Effects of aeration on suction pressure in a submerged membrane bioreactor," Water Research 31(3), pp. 489-494 (1997).
Vaha-Nissi, et al., "Growth of thin $Al_2O_3$ films on biaxially oriented polymer films by atomic layer deposition," Thin Solid Films 522, pp. 50-57 (2012).
Wang, et al., "Directional water-transfer through fabrics induced by asymmetric wettability," Journal of Materials Chemistry 20, 7938 (2010).
Wang, et al., "Extremely Efficient and Recyclable Absorbents for Oily Pollutants Enabled by Ultrathin-Layered Functionalization," ACS Applied Materials & Interfaces 6(21), pp. 18816-18823 (2014).
Wang, et al., "Rapid and Efficient Separation of Oil from Oil-in-Water Emulsions Using a Janus Cotton Fabric," Angewandte Chemie International Edition 55(4), pp. 1291-1294 (2016).
Wang, et al., "Simply realizing 'water diode' Janus membranes for multifunctional smart applications," Materials Horizons 4, pp. 701-708 (2017).
Wen, et al., "Zeolite-coated mesh film for efficient oil-water separation," Chemical Science 4, pp. 591-595 (2013).
Wu, et al., "Janus Membranes with Opposing Surface Wettability Enabling Oil-to-Water and Water-to-Oil Emulsification," ACS Applied Materials & Interfaces 9(6), pp. 5062-5066 (2017).
Wu, et al., "Unidirectional water-penetration composite fibrous film via electrospinning," Soft Matter 8, 5996 (2012).
Xue, et al., "A Novel Superhydrophilic and Underwater Superoleophobic Hydrogel-Coated Mesh for Oil/Water Separation," Advanced Materials 23(37), pp. 4270-4273 (2011).
Yang, et al., "Janus hollow fiber membrane with a mussel-inspired coating on the lumen surface for direct contact membrane distillation," Journal of Membrane Science 523, pp. 1-7 (2017).
Yang, et al., "Janus Membranes with Asymmetric Wettability for Fine Bubble Aeration," Advanced Materials Interfaces 3(9), pp. 1-5 (2016).
Yang, et al., "Janus Membranes: Exploring Duality for Advanced Separation," Angewandte Chemie International Edition 55(43), pp. 13398-13407 (2016).

(56) References Cited

OTHER PUBLICATIONS

Yang, et al., "Mussel-inspired modification of a polymer membrane for ultra-high water permeability and oil-in-water emulsion separation," Journal of Materials Chemistry A 2, pp. 10225-10230 (2014).

Yang, et al., "Paper-Based Microfluidic Devices: Emerging Themes and Applications," Analytical Chemistry 89(1), pp. 71-91 (2017).

Yang, et al., "Polymer membrane with a mineral coating for enhanced curling resistance and surface wettability," Chemical Communications 51, pp. 12779-12782 (2015).

Yang, et al., "Silica-Decorated Polypropylene Microfiltration Membranes with a Mussel-Inspired Intermediate Layer for Oil-in-Water Emulsion Separation," ACS Applied Materials & Interfaces 6(15), pp. 12566-12572 (2014).

Yang, et al., "Surface and interface engineering for organic-inorganic composite membranes," Journal of Materials Chemistry A 4(25), pp. 9716-9729 (2016).

Zang, et al., "Well-Aligned Cone-Shaped Nanostructure of Polypyrrole/RuO2 and Its Electrochemical Supercapacitor," The Journal of Physical Chemistry C 112(38), pp. 14843-14847 (2008).

Zhang & Barboiu, "Dynameric asymmetric membranes for directional water transport," Chemical Communications 51, pp. 15925-15927 (2015).

Zhang, et al., "Biomimetic multifunctional nanochannels based on the asymmetric wettability of heterogeneous nanowire membranes," Advanced Materials 26(7), pp. 1071-1075 (2014).

Zhang, et al., "Mineralized growth of Janus membrane with asymmetric wetting property for fast separation of a trace of blood," Journal of Materials Chemistry B 5, pp. 4876-4882 (2017).

Zhang, et al., "Nanowire-Haired Inorganic Membranes with Superhydrophilicity and Underwater Ultralow Adhesive Superoleophobicity for High-Efficiency Oil/Water Separation," Advanced Materials 25(30), pp. 4192-4198 (2013).

Zhang, et al., "Salt-Induced Fabrication of Superhydrophilic and Underwater Superoleophobic PAA-g-PVDF Membranes for Effective Separation of Oil-in-Water Emulsions," Angewandte Chemie International Edition 53(3), pp. 856-860 (2014).

Zhang, et al., "Superhydrophobic and Superoleophilic PVDF Membranes for Effective Separation of Water-in-Oil Emulsions with High Flux," Advanced Materials 25(14), pp. 2071-2076 (2013).

Zhao, et al., "Directional Fluid Transport in Thin Porous Materials and its Functional Applications," Small 13(4), pp. 1-22 (2017).

Zheng & Yapa, "Bouyant Velocity of Spherical and Nonspherical Bubbles/Droplets," Journal of Hydraulic Engineering 126(11), pp. 852-854 (2000).

Zhou, et al., "Superphobicity/philicity janus fabrics with switchable, spontaneous, directional transport ability to water and oil fluids," Sci. Rep., 3, pp. 1-6 (2013).

Afshar & Cadien, "Growth mechanism of atomic layer deposition of zinc oxide: A density functional theory approach," Applied Physics Letters 103(25), 251906, 6 pages (2013).

Kowalik, et al., "Extra-Low Temperature Growth of ZnO by Atomic Layer Deposition with Diethylzinc Precursor," Acta Physica Polonica A 112(2), pp. 401-406 (2007).

Ferguson, et al., "Atomic Layer Deposition of Al2O3 Films on Polyethylene Particles," Chemistry of Materials 16(26), pp. 5602-5609 (2004).

* cited by examiner

Untreated

ALD

SIS (tool 1)

FILTRATION MEMBRANES

The United States Government claims certain rights in this invention pursuant to Contract No. W-31-109-ENG-38 between the United States Government and the University of Chicago and/or pursuant to DE-AC02-06CH11357 between the United States Government and UChicago Argonne, LLC representing Argonne National Laboratory.

TECHNICAL FIELD

The present disclosure relates generally to filtration membranes and more specifically to polymer membranes.

BACKGROUND

Membrane filtration is a multi-billion dollar industry with substantial growth potential. Nearly all commercial membranes are manufactured from polymeric materials (polyamide, polyethersulfone, polyvinylidene fluoride, cellulose acetate, and polytetrafluoroethylene). These materials are fragile. They have limited thermal stability (generally 50 C or less) and poor pH, solvent, and chlorine resistance, each of which severely limits their potential applications-especially in industrial settings.

The primary operating cost of commercial filtration installations is applying pressure to drive fluid through the membrane. Through the course of filtration, materials rejected by the membrane gather at the surface in a process called fouling. Fouling constricts the pores of the membrane and requires that a larger pressure be applied to achieve the same fluid flow, increasing costs to the operator. Polymeric membranes are especially prone to fouling.

In some cases, there are commercial ceramic membranes that can overcome many of these limitations, but these are much more expensive to manufacture and are not generally available for very small (<20 nm) pore sizes. Another approach that has been proposed specifically for the nanofiltration regime (but not implemented commercially) is to use graphene oxide membranes.

Thus, there remains a need for a membrane that provides the beneficial resistance and lifespan of ceramic membranes with the beneficial properties and low cost of polymer membranes.

SUMMARY

Embodiments described herein relate generally to the modification of polymeric membranes via SIS to promote membrane resilience, prolong membrane lifetime, and mitigate fouling.

A membrane comprising a polymer bulk material forming a body of the membrane having an outer surface. An inorganic material is disposed in the outer surface. The membrane further comprises an inner core of the polymer bulk material that is substantially free of the inorganic material.

A method for forming a membrane with inorganic features comprising reacting a polymer substrate surface with a first precursor to form a first layer. Excess first precursor and first half-reaction by-product are purged. The first layer is reacted with a second precursor. Excess second precursor and second half-reaction by-product are purged. An inorganic shell is formed within the polymer substrate surface.

It should be appreciated that all combinations of the foregoing concepts and additional concepts discussed in greater detail below (provided such concepts are not mutually inconsistent) are contemplated as being part of the subject matter disclosed herein. In particular, all combinations of claimed subject matter appearing at the end of this disclosure are contemplated as being part of the subject matter disclosed herein.

BRIEF DESCRIPTION OF DRAWINGS

The foregoing and other features of the present disclosure will become more fully apparent from the following description and appended claims, taken in conjunction with the accompanying drawings. Understanding that these drawings depict only several implementations in accordance with the disclosure and are therefore, not to be considered limiting of its scope, the disclosure will be described with additional specificity and detail through use of the accompanying drawings.

Figure 1A:
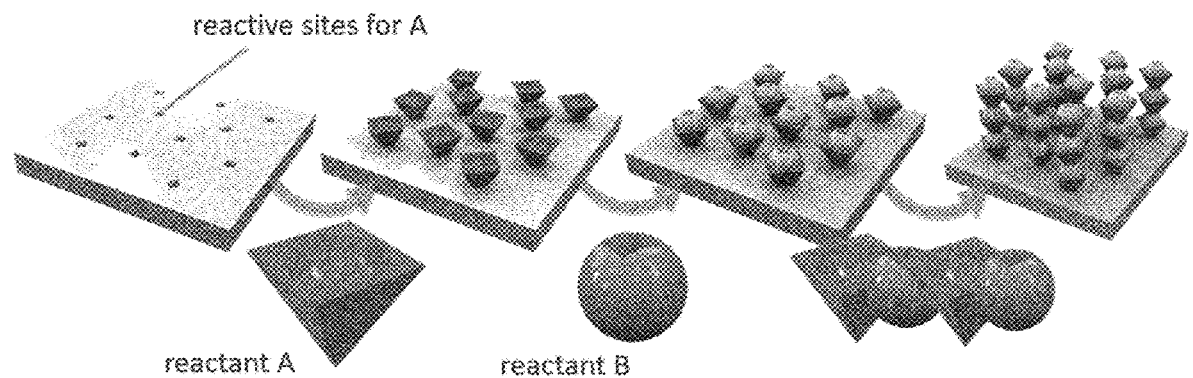
FIG. 1A is an illustration of the mechanisms of ALD compared to the mechanism of SIS for a general reactive site and a first reactant A and second reactant B.
Figure 1B:
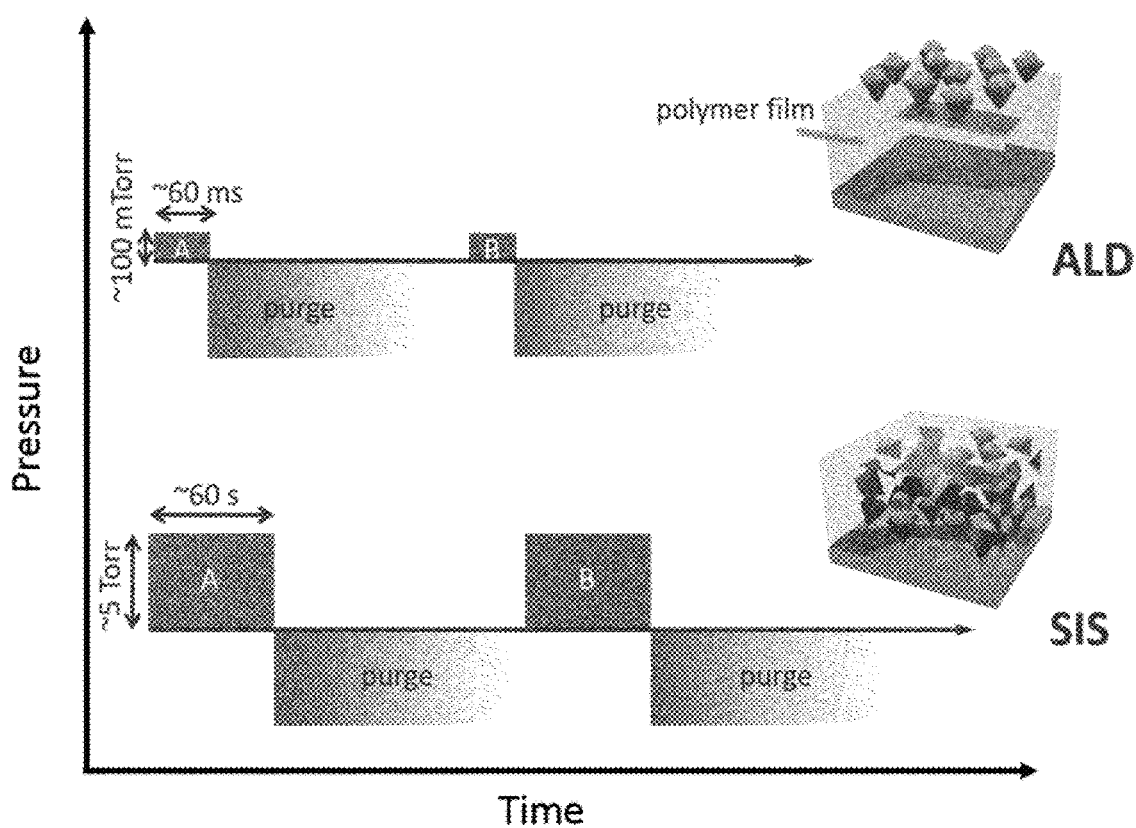
FIG. 1B is a graph of pressure over time elapsed for both ALD and SIS processes as well as an illustration of the corresponding resultant film.
Figure 1C:
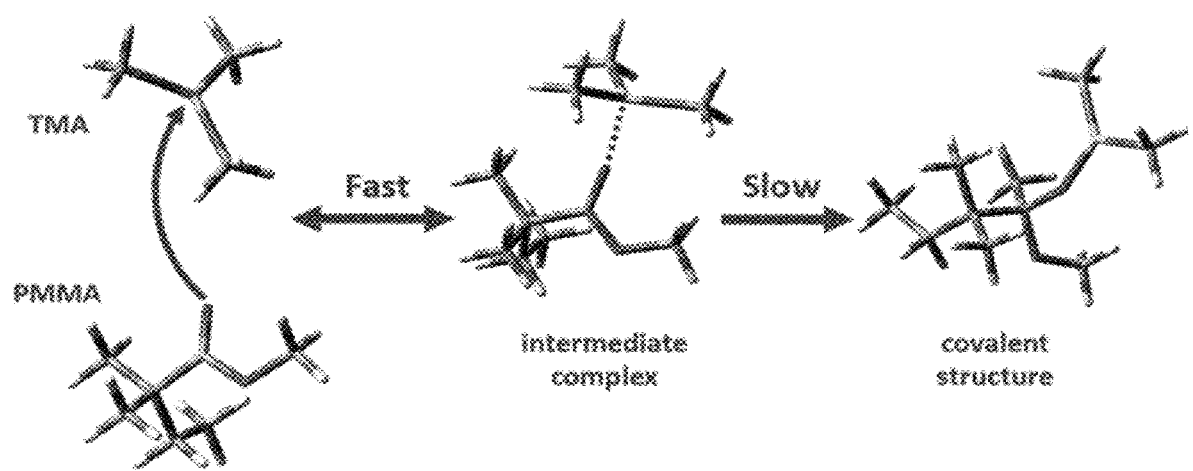
FIG. 1C is an illustration of the mechanism of covalent bonding between a polymer membrane functional group and the SIS reactant A.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION OF VARIOUS EMBODIMENTS

Embodiments described herein relate generally to polymer membranes with an inorganic component within the bulk of the polymer membrane. In particular, as described further herein, the polymer membranes include inorganic components therein formed by sequential infiltration synthesis. SIS processes often comprise two half-reactions, whereby precursor materials for each half-reaction are kept separated throughout the coating process. SIS film growth is based on self-limiting surface reactions, which makes achieving atomic scale deposition control possible. In a first half-reaction, a precursor gas is introduced to a substrate surface and produces a first layer. Excess or unreacted species and/or reaction by-product from the first half-reaction may be purged from the substrate surface by flow of inert gas (i.e. nitrogen, argon, etc.), vacuum evacuation, or other similar removal techniques. A second precursor of gas is then introduced to the substrate surface and reacts with the first layer to produce a layer of film on the substrate surface.

Excess or unreacted species and/or reaction by-product from the second half-reaction may be purged from the deposition chamber using similar evacuation methods as used for the excess or unreacted species and/or reaction by-product from the first half-reaction.

Such SIS-modified polymer membranes or polymer membranes with inorganic components, provide improved properties, particularly resistance to solvents or environmental degradation. SIS differs notably from Atomic Layer Deposition (ALD) in how the materials deposited are located relative to the substrate, where ALD deposited on a surface while SIS deposits in the surface and/or within the bulk of the substrate. In some embodiments, a membrane refers to a selective barrier made of polymeric material. As used herein, surface means refers to a two nanometer thick boundary between the void space beyond the material, such as the void space of the pores defined by the material, and the polymeric morphological features of the membrane. The surface comprises the interface between the polymeric structure of the membrane and external environment, such as the pore space. Further, as used herein "bulk" means polymer material comprising the membrane morphology that is more than two nanometers away from the surface. Polymer in the "bulk" plays a structural role in the membrane morphology. Inorganic components as used herein refer to metals, metal oxides, metal halides, and all other solid state crystalline or amorphous inorganic materials that can be used in the vapor phase to diffuse into a polymer in an SIS process.

Existing deposition techniques fail to provide a modified polymer membrane with the desired properties. For example, ALD can be used to deposit inorganic materials in the surface of a polymer membrane. However, ALD-modified polymer membranes have several failings. For example, because ALD (or other surface deposition techniques including sputtering and chemical vapor deposition) forms the inorganic material on the surface of the polymer, it forms an inorganic shell on the exterior of the polymer. A superficial inorganic shell can flake or delaminate, whereas a concurrent infiltration of material into the bulk will not.

As further described herein, Sequential Infiltration Synthesis ("SIS") is utilized with polymeric membranes imparting thermal and chemical stability and fouling mitigation. Polymeric membranes include, for example, but are not limited to: cellulose (CA), polyvinyl chloride (PVC), polyvinylidene fluoride (PVDF), polypropylene (PP), polyether sulfone (PES), polyacrilonitrile (PAN), polytetrafluoroethylene (PTFE). Polymeric membranes include membranes with grafted copolymers, and membranes coated or otherwise treated with hydrophilic enhancers including polyvinyl pyridine (PVP) and all other related polymers. The invention encompasses amorphous, semicrystalline, and highly crystalline polymers. Polymeric membranes include materials that are fabricated or synthesized by methods including but not limited to: track etching, electrospinning, interfacial polymerization, solvent-nonsolvent induced phase separation (SNIPS), and all modifications and variations of these methods.

In one embodiment, a polymeric membrane having an organic core is formed. In this embodiment, SIS is performed on a polymeric membrane, leaving an organic core in each fiber comprising the microstructure, i.e. the unaltered bulk, of the membrane prior to SIS treatment.

In one embodiment, the desired dimensions of the polymer membrane features dictate the SIS processing parameters. As an example, to leave an organic core comprising 90% of the original membrane structure, the parameters should be chosen to enable SIS to occur 10% of the way into the structure.

In one realization of this embodiment, the processing parameters were as follows. An ALD chamber with a temperature of 95 C is used. After the membrane is introduced into the chamber, the chamber is pumped to vacuum. The exhaust valve of the chamber is shut, and trimethyl aluminum (TMA) is introduced into the chamber. TMA is introduced in five 0.04 seconds pulses separated by twenty seconds. This cumulative dose of TMA is retained for 5 minutes yielding a TMA partial pressure of 1 torr. After this exposure step the exhaust is opened to vent the TMA gas. The exhaust is closed again, and water vapor is pulsed in under the same conditions. This process constitutes one SIS cycle. Between one and five SIS cycles can be employed. The duration of the precursor pulse and resulting pressure of precursor vapor, the temperature of the chamber, and the duration of exposure of the precursor vapor to the membrane can be individually or collectively tuned to adjust the density of the resultant inorganic material and the depth of bulk to which the inorganic material reaches.

In one embodiment, the SIS process utilizes a pressure between 60 and 100 torr for precursor application. In one embodiment, the SIS process uses an exposure time of between 0.2 and 1.0 seconds. The exposure time may comprises a series of discrete pulses of precursor. The SIS process may be used to extend the inorganic material beyond the surface into the bulk.

Such an approach would impart chemical resistance, but would have minimal thermal benefits. Organic core SIS-modified polymer membranes would be useful for processes involving non-aqueous solvent process streams, highly alkaline process streams, and those involving strong oxidizers such as chlorine (widely used in water treatment). The introduction of ceramics in the surface would reduce the propensity of fouling to occur, enabling lower pressures to be used.

In another embodiment, a SIS polymer membrane is further treated to remove the polymeric content, through thermal degradation, chemical etching, or plasma etching. This results in a ceramic membrane, templated to the initial structure. A SIS polymer membrane is formed under higher temperatures, and higher pressures of precursor. The result is that inorganic material has infiltrated significantly into the bulk, such that the entire membrane can be considered a composite polymer/inorganic material with the same morphology as the original membrane. The resultant membrane is then subjected to thermal, plasma, or chemical etching to remove the polymeric content of this post-SIS composite. An inorganic structure directly 3-D templated by the original membrane morphology is the result. This would achieve the chemical stability outlined above as well as impart substantial thermal stability (>400 C). The resultant structure is a direct conversion of the polymer structure to be replaced with inorganic materials. Even when the polymer material is removed, the resulting shell is stable.

In another embodiment, the SIS process may be utilized to create an asymmetrical or "Janus" membrane. For example, the SIS process could applied through a reactor to selectively engage only one side of the membrane or engage one side of the membrane with a higher concentration of precursors so as to more deeply and/or thoroughly infiltrate the membrane to form inorganic material. In one set-up, a backflow of inert gas can be utilized and flowed over the backside of the membrane during the precursor exposure so as to allow the backside to remain unmodified by the SIS process. In alternative embodiments, the reactor maybe set up to provide flow of precursors isolated or substantially favoring interaction with one portion, such as one side, of a membrane. In another embodiment, masking with a non-reactive, blocking material may be utilized to prevent SIS reaction with portions of the membrane. Such masking material may be removed after the SIS process is completed to leave exposed polymer material of the membrane.

An additional benefit of this invention is the potential to improve hydrophilicity of the membranes, thereby reducing energy consumption associated with their use (reducing pressure needed to process water streams).

Cleaning of these membranes is also more straightforward than with standard polymeric membranes. The presence of the inorganic materials provides for improved resistance and degradation resistance during cleaning.

In one embodiment, SIS-modified polymeric membranes exhibit improved lifetimes over the same membranes without the SIS modification. This will result in a savings for maintenance and operating costs in using such membranes. Further, the improved lifetimes and durability. Another advantage is that the use of SIS to provide an inorganic growth within the membrane does not alter the size of the membrane substantially while traditional deposition processes deposited on the membrane increase the volume. Another advantage is that an SIS-modified membrane includes the inorganic deposited material integrated with the membrane rather than merely coated on the membrane, making removal of the inorganic material without destruction of the membrane very difficult.

EXAMPLES

As a proof of concept, an untreated polyethersulfone (PES) membrane and a PES membrane modified by SIS according to the recipe in above ([0023]) were dipped in pure chloroform solvent. The untreated membrane completely dissolved, but the treated membrane retained its structure.

Figure 2A:
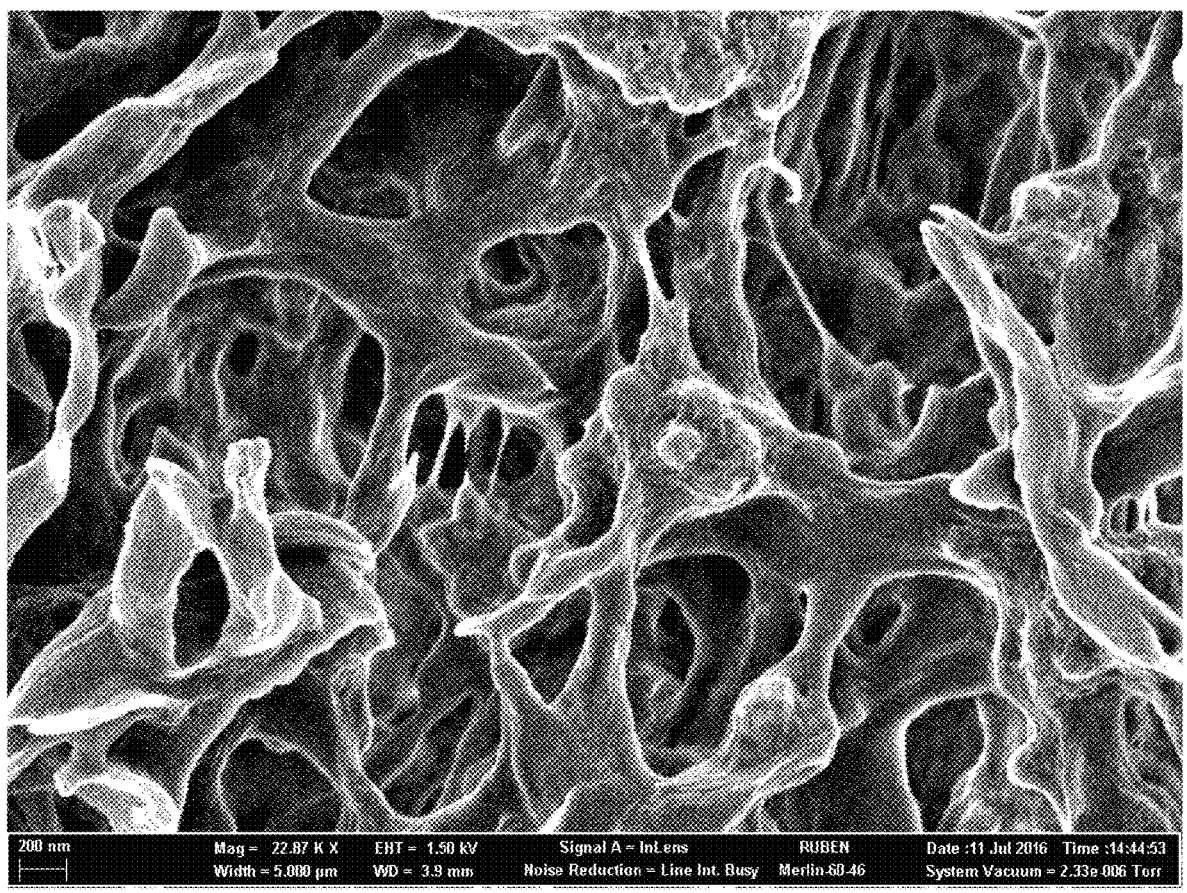
FIG. 2A is a photomicrograph of an untreated sample PVDF membrane.
Figure 2B:
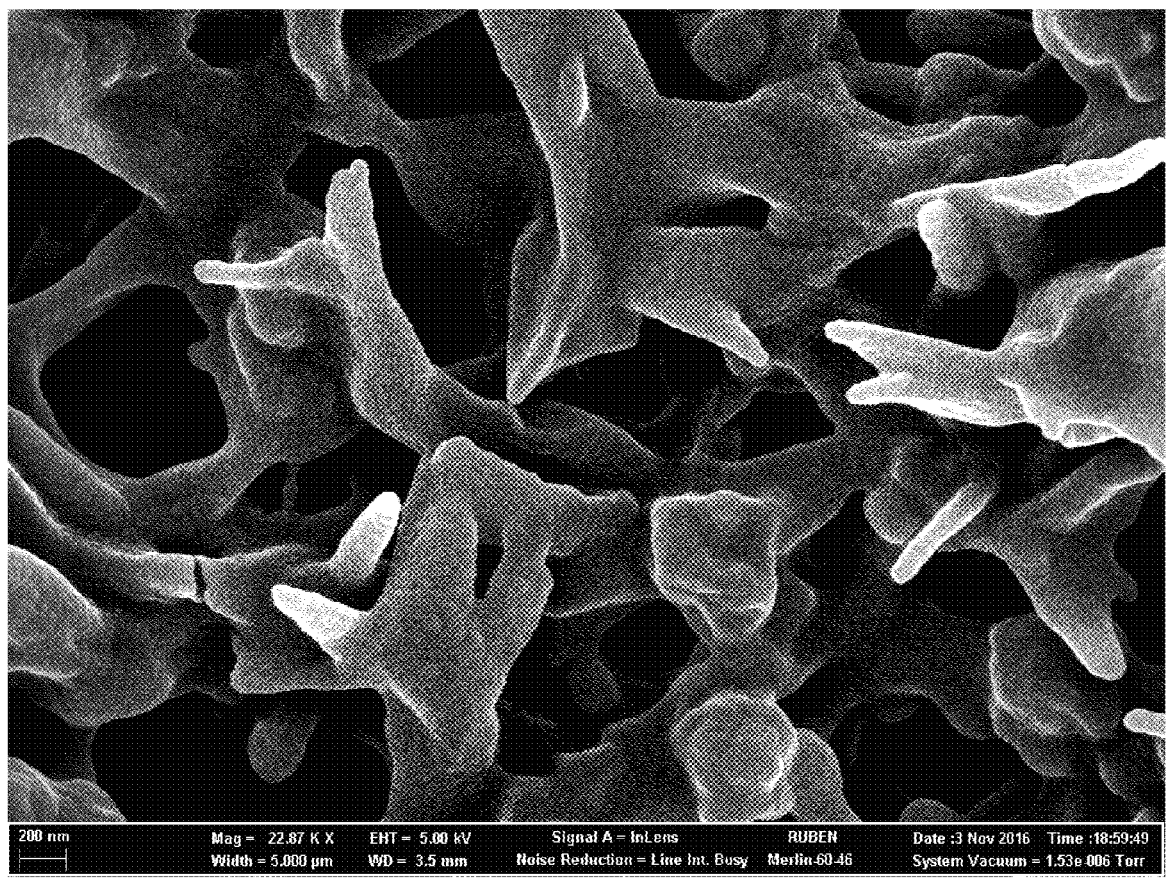
FIG. 2B is a photomicrograph of an ALD-treated sample PVDF membrane.
Figure 2C:
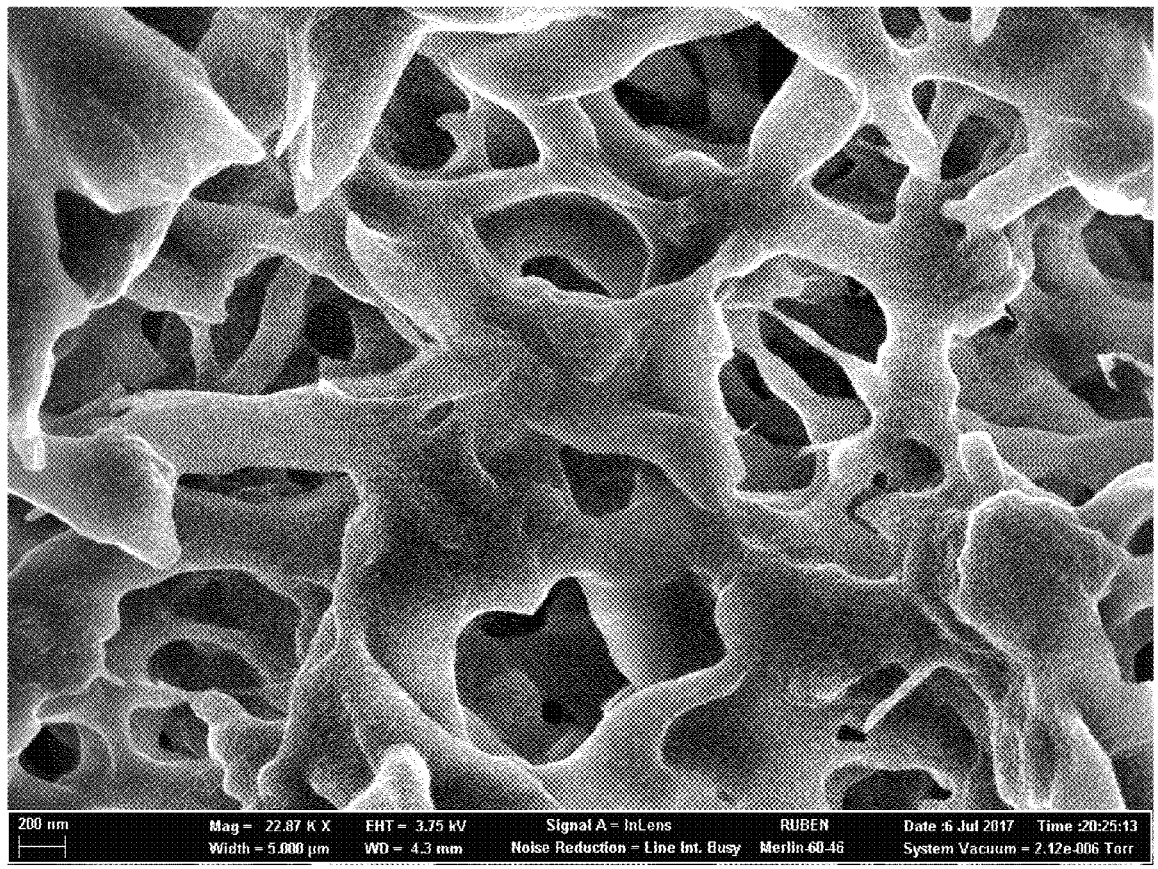
FIG. 2C is a photomicrograph of an SIS-treated sample PVDF membrane.
Figure 3A:
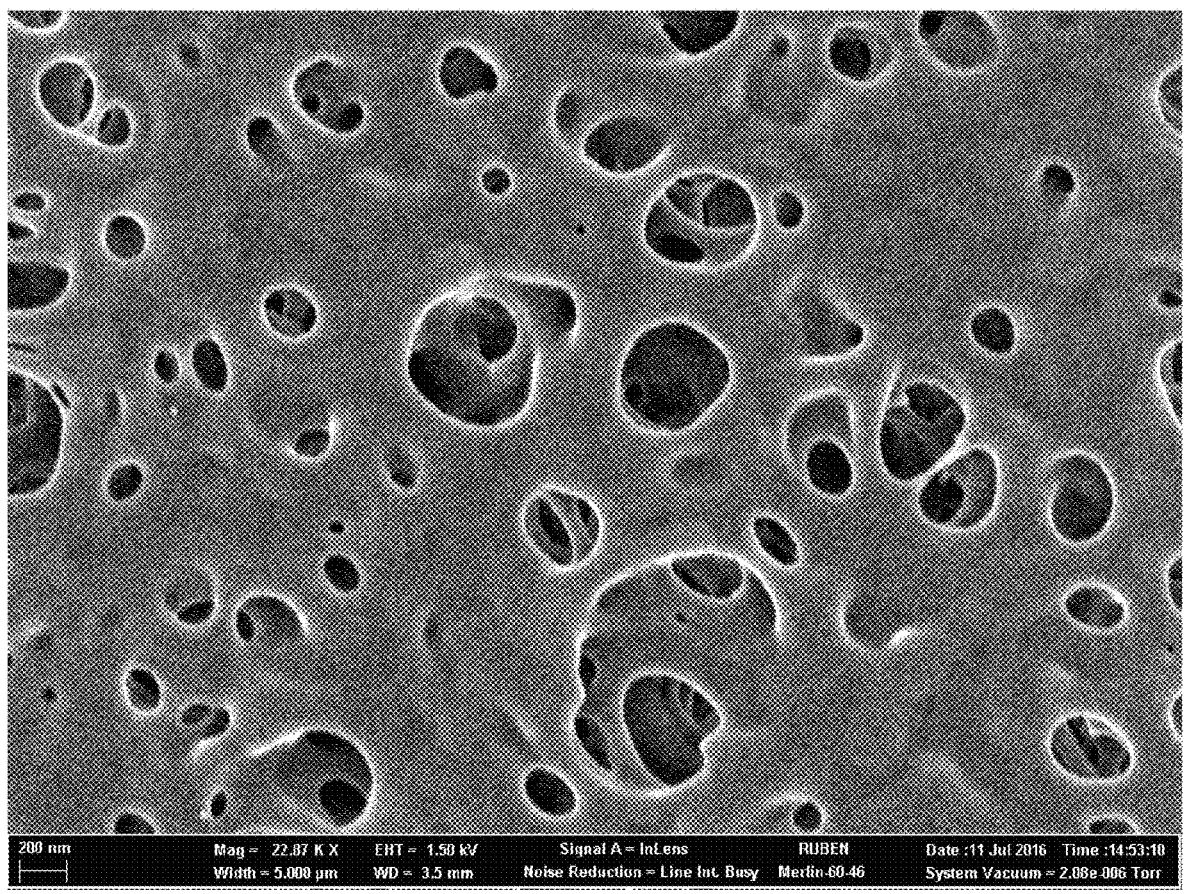
FIG. 3A is a photomicrograph showing pristine PES.
Figure 3B:
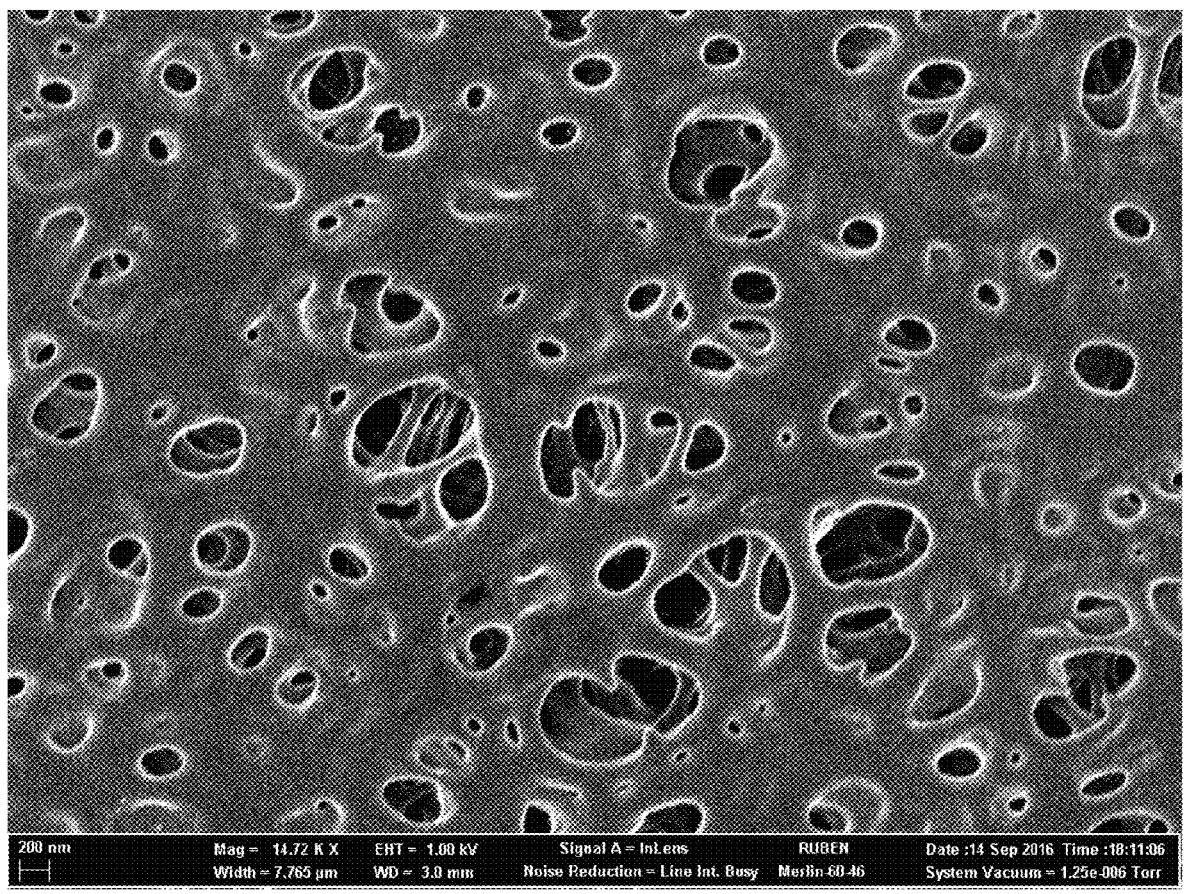
FIG. 3B is a photomicrograph showing ALD-treated PES.

In one exemplary experiment, deposition of $Al_2O_3$ was performed on polyvinylidene fluoride (PVDF) by ALD and deposition of $Al_2O_3$ was performed within PVDF by SIS. FIGS. 2A-2C are photomicrographs of the resultant polymer membranes.

The PVDF polymer membrane of FIG. 2A is an untreated PVDF polymer membrane. In this figure the polymer surface is relatively smooth.

The PVDF polymer membrane of FIG. 2B was formed by ALD as follows. The substrate was held at 80 C. First 0.015 seconds of TMA were pulsed yielding a pressure of 0.1 Torr. After 10 seconds, 0.015 seconds of water vapor were pulsed yielding a pressure of 0.1 Torr. This sequence was repeated 100 times. Note that FIG. 2B shows a rough surface crust of oxide material that is a result of the surface-limited growth of ALD.

Note that the FIG. 2C shows a rougher surface than 2A, indicating the presence of inorganic material within the bulk of the polymer features. Unlike 2B, the material of 2C grown by SIS is not grown on the surface of the polymer feature outwards to form a coating, but rather pervades into surface and into the bulk of the material.

In another embodiment, such as for PVDF, each cycle of SIS was carried out at a reaction temperature of 95° C. with 200 ms TMA exposure×10 with a 5 minute dwell time and a 5 minute purge time and a 200 ms H20 exposure×10 with a 5 minute dwell time and a 5 minute purge time. This cycle was repeated 3 times.

As used herein, the singular forms "a", "an" and "the" include plural referents unless the context clearly dictates otherwise. Thus, for example, the term "a member" is intended to mean a single member or a combination of members, "a material" is intended to mean one or more materials, or a combination thereof.

As used herein, the terms "about" and "approximately" generally mean plus or minus 10% of the stated value. For example, about 0.5 would include 0.45 and 0.55, about 10 would include 9 to 11, about 1000 would include 900 to 1100.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Other substitutions, modifications, changes and omissions may also be made in the design, operating conditions and arrangement of the various exemplary embodiments without departing from the scope of the present invention.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A method for forming a membrane with inorganic features comprising:
   (a) exposing a polymer membrane, which comprises a polyvinylidene fluoride polymer substrate, with a first precursor, comprising trimethyl aluminum (TMA), wherein exposing the first precursor comprises exposing the TMA in at least five exposure pulses for at least 5 continuous minutes of dwell time with a first precursor partial pressure of 1 torr to form by a first reaction a first layer within a bulk of the polymer substrate;

(b) purging excess first precursor and first reaction by-product;

(c) reacting the first layer with a second precursor within the bulk of the polymer substrate by a second reaction; and (d) purging excess second precursor and second reaction by-product, wherein steps (a) to (d) constitute one cycle and steps (a) to (d) are repeated 0 to 4 times, and forming the membrane with inorganic features comprising an inorganic shell within the polymer substrate.

2. The method of claim 1, wherein each of the at least five exposure pulses is 0.04 seconds and wherein 20 seconds separates each exposure pulse.

3. The method of claim 1, wherein the second precursor is an oxidizer.

4. The method of claim 1, wherein the second precursor comprises water.

5. The method of claim 1, further comprising treating the polymer substrate with a hydrophilic enhancer prior to exposing the first precursor to the polymer substrate.

6. The method of claim 1, further comprising removing the polymer substrate from the membrane so that the membrane comprises the inorganic shell.

7. The method of claim 6, wherein removing the polymer substrate comprises a process selected from thermal treatment, plasma treatment, or chemical treatment.

8. The method of claim 1, comprising repeating steps (a) to (d) 0 to 4 times, wherein the inorganic shell is the outer 10% of the membrane.

9. The method of claim 1, further comprising, during one or both of reacting the polymer substrate with the first precursor and reacting the first layer with the second precursor, providing a backflow of inert backflow gas.

10. A method for forming a membrane with inorganic features comprising:

(a) exposing a polymer membrane, which comprises a polymer substrate, with a first precursor, comprising trimethyl aluminum (TMA), wherein exposing the first precursor comprises exposing the TMA in at least five exposure pulses for at least 5 continuous minutes of dwell time with a first precursor partial pressure of 1 torr to form by a first reaction a first layer within a bulk of the polymer substrate;

(b) purging excess first precursor and first reaction by-product;

(c) reacting, by a second reaction, the first layer with a second precursor within the bulk of the polymer substrate; and (d) purging excess second precursor and second reaction by-product, wherein steps (a) to (d) constitute one cycle and steps (a) to (d) are repeated 0 to 4 times, forming the membrane with inorganic features comprising an inorganic shell within the polymer substrate.

* * * * *